April 19, 1949.  M. H. HOLLINGSWORTH  2,467,478
SHOCK ABSORBING SPRING STRUCTURE
Filed May 18, 1945
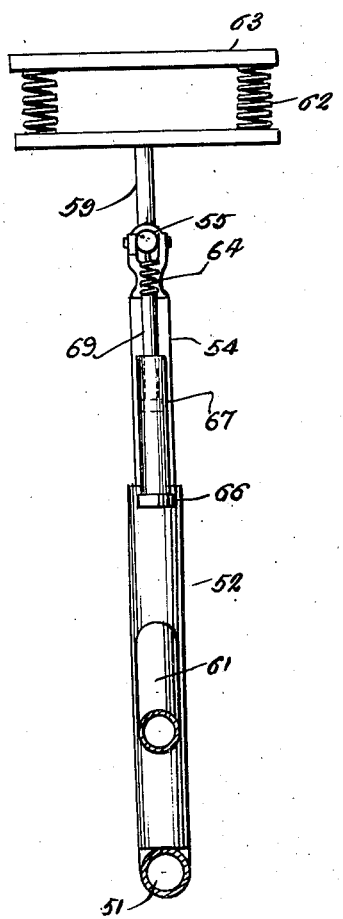
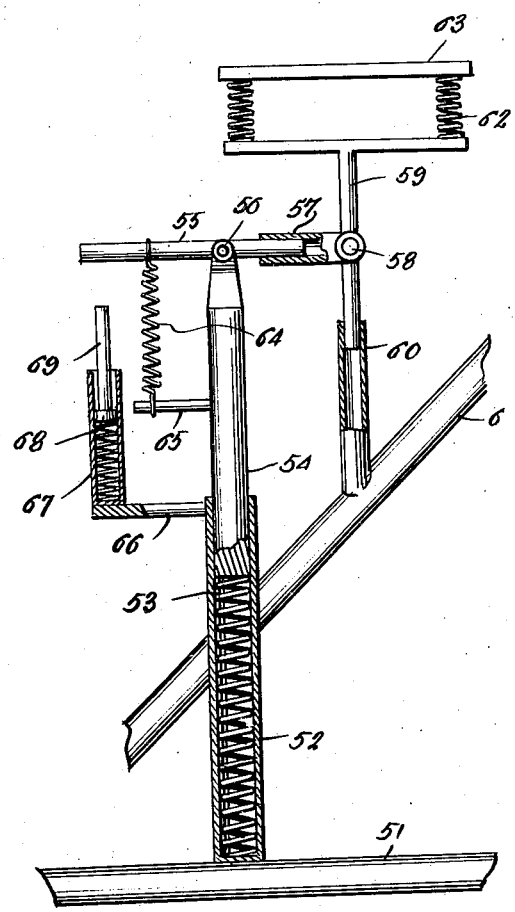
Inventor
M. H. HOLLINGSWORTH
By Randolph & Beavers
Attorney Patented Apr. 19, 1949

2,467,478

UNITED STATES PATENT OFFICE 2,467,478

SHOCK ABSORBING SPRING STRUCTURE

Maurice H. Hollingsworth, San Antonio, Tex.

Application May 18, 1945, Serial No. 594,502

3 Claims. (Cl. 280—283)

The present invention relates specifically and by example to a shock absorbing resilient structure for motorcycles in which a designated part such as the saddle is subjected to a vertical movement as a reaction to or result of an upward thrust from the wheel axles caused by the wheels passing over an uneven road surface.

One object of the invention is to provide a motor cycle with an improved saddle supporting structure of such construction that while the saddle and the frame may have movements relative to each other such movements will be checked and shocks absorbed by action of springs interposed between moving parts.

Another object of the invention is to provide a seat supporting structure so constructed that violent shocks may be absorbed as well as ordinary shocks caused during the riding of a motor cycle.

Another object of the invention is to provide a seat supporting structure which is of such formation that does not detract from the appearance of the motor cycle.

With these and other objects the invention consists of a special construction and arrangement of parts illustrated in the accompanying drawings wherein:

Figure 1 is a view showing the improved seat supporting structure and associated parts of a motor cycle partially in side elevation and partially in vertical section.

Figure 2 is a rear view of the structure shown in Figure 1.

In the accompanying drawings there has been shown a fragment of a motor cycle frame which includes a horizontally extending bottom bar 51 formed of metal tubing. From this bottom bar rises a tubular housing 52 which is opened at its top in order that coiled spring 53 may be dropped into it. Into the tubular housing 52 fits the lower portion of a vertically extending plunger 54 which is formed of solid metal and projects upwardly from the housing. The upper end of the plunger is formed with forks which straddle a horizontally extending lever 55 and are pivotally connected therewith by a pin 56, and from an inspection of Figure 1 it will be seen that the lever projects forwardly and rearwardly from the plunger and has its forward end portion slidably engaged in a sleeve or socket 57 which projects rearwardly from a plunger 59 to which its front end is pivotally connected by a pin 58. This plunger 59 constitutes a standard for a seat or saddle and at its upper end carries a cross head while its lower end portion is slidably engaged in a sleeve or tubular guide 60 rising from a bar 61 forming a portion of the motor cycle frame. The cross head or platform at the upper end of the plunger 59 extends longitudinally of the motor cycle frame and also transversely thereof in order to provide a platform of appreciable area and at its corners carries coiled springs 62 forming yieldable supports for a seat or saddle 63 of any conventional form. Slight jolts will cause compression of the springs 62 and more pronounced jolts will cause the plunger 59 to slide vertically in the tubular guide 60, downward tilting of the front end of the lever 55 being resisted by a tension spring 64 which is spaced rearwardly from the plunger 54 and has its upper end connected with the rear portion of the lever and its lower end anchored to an arm 65 projecting rearwardly from the plunger. An arm 66 extends rearwardly from the upper end of the housing 52 and at its rear end carries an upwardly projecting tubular guide or housing 67 in which a coiled spring 68 is mounted. The spring constitutes a yieldable support for a plunger 69 which slides freely in the guide and projects upwardly therefrom. Ordinarily the upper end of the plunger 69 is spaced downwardly from the lever 55 but when the motor cycle is subjected to a very severe jolt and excessive downward movement is imparted to the plunger 54 the rear portion of the lever will make contact with the upper end of plunger 69 and excessive jolts will be absorbed. It will thus be seen that this improved construction will cause slight jolts, moderate jolts, and excessive jolts to be absorbed and a person may ride the motor cycle with comfort.

What I claim as new and desire to secure by Letters Patent is:

1. A motorcycle spring frame structure comprising a frame, a spring guided for vertical movement by and mounted on the frame, a plunger guided by the frame and supported by the spring, a lever pivoted on the top of the plunger and normally resiliently held in a horizontal position, a saddle pivotally and slidably connected to the front end of the lever and vertically guided by the frame, and a resiliently supported plunger guided by the frame and adapted to engage the lower face of the rear end of the lever during extraordinary shocks to lower the saddle.

2. In a motor cycle, a frame including a horizontally extending lower bar and a second bar spaced upwardly therefrom, a tubular housing rising from the lower bar and open at its upper end, a coiled spring in said housing, a plunger slidable vertically in said housing through the upper end thereof and projecting upwardly from the housing, a lever pivoted to the upper end of said plunger and projecting forwardly and rearwardly therefrom, a tubular guide rising from the upper bar forwardly of said housing and open at its upper end, a standard slidable vertically in said guide through the upper end thereof and having a cross head at its upper end, springs carried by said cross head, a seat mounted upon said springs, a socket pivoted to said standard and projecting rearwardly therefrom and into which the forward portion of said lever slidably fits, an arm projecting rearwardly from said plunger, a tension spring disposed vertically back of the plunger and having its upper end connected with the rear portion of said lever and its lower end anchored to said arm, an arm projecting rearwardly from said housing, a tubular guide projecting upwardly from the last mentioned arm, a coiled spring in the last mentioned guide, and a plunger slidable vertically in the last mentioned guide through the upper end thereof with its lower end resting upon the spring therein and its upper end disposed under the rear portion of the lever and normally out of contact with the lever.

3. In a motor cycle, a frame including a lower bar and an upper bar, a tubular housing rising from the lower bar, a plunger slidable vertically in the housing through the upper end thereof, a spring in the housing yieldably supporting the plunger, a guide rising from the upper bar, a seat structure including a standard mounted for vertical sliding movement by said guide, a lever pivoted to the upper end of said plunger and projecting forwardly and rearwardly therefrom, a member pivoted to and extending rearwardly from said standard and having sliding engagement with the front portion of said lever, an arm projecting rearwardly from said plunger, a spring extending vertically between and secured to the arm and the rear portion of said lever, an arm projecting rearwardly from said housing, a guide rising from the last mentioned arm, a plunger carried by the last mentioned guide and slidable vertically, and a spring yieldably supporting the last mentioned plunger in a raised position with its upper end normally spaced downwardly from the lever.

MAURICE H. HOLLINGSWORTH.

REFERENCES CITED

The following references are of record in the file of this patent:

UNITED STATES PATENTS

| Number | Name | Date |
|---|---|---|
| 644,769 | Jenne | Mar. 6, 1900 |
| 900,779 | Rantz | Oct. 13, 1908 |
| 1,003,908 | Holaway | Sept. 19, 1911 |
| 1,111,924 | Smith | Sept. 29, 1914 |
| 1,445,765 | Hendrickson | Feb. 20, 1923 |

FOREIGN PATENTS

| Number | Country | Date |
|---|---|---|
| 500,638 | Great Britain | May 13, 1937 |
| 503,374 | France | Mar. 16, 1920 |